(12) United States Patent
Pautis et al.

(10) Patent No.: US 12,722,787 B2
(45) Date of Patent: Sep. 1, 2026

(54) ASSEMBLY OF AN ATTACHMENT PYLON WITH AN AIRCRAFT ENGINE

(71) Applicant: Airbus Operations SAS, Toulouse (FR)

(72) Inventors: Olivier Pautis, Toulouse (FR); Michael Berjot, Toulouse (FR); Jean-Baptiste Vignes, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 50 days.

(21) Appl. No.: 18/761,912

(22) Filed: Jul. 2, 2024

(65) Prior Publication Data

US 2025/0010997 A1 Jan. 9, 2025

(30) Foreign Application Priority Data

Jul. 3, 2023 (FR) ...................................... 2307061

(51) Int. Cl.
*B64D 27/40* (2024.01)

(52) U.S. Cl.
CPC ......... *B64D 27/402* (2024.01); *B64D 27/406* (2024.01)

(58) Field of Classification Search
CPC ..... B64D 27/402; B64D 27/404; B64D 27/40
See application file for complete search history.

(56) References Cited

U.S. PATENT DOCUMENTS 9,745,072 B2 * 8/2017 Lin ...................... B64D 27/404
2009/0218441 A1 9/2009 Marche
2015/0122943 A1 5/2015 Wu et al.
2018/0186462 A1 * 7/2018 Brochard ............ B64D 27/404

FOREIGN PATENT DOCUMENTS

EP 1943145 B1 2/2009
FR 3098793 A1 1/2021

OTHER PUBLICATIONS

French Search Report for corresponding French Patent Application No. 2307061 dated Jan. 17, 2024.

* cited by examiner

*Primary Examiner* — Nicholas McFall
*Assistant Examiner* — Eric Acosta
(74) *Attorney, Agent, or Firm* — Greer, Burns & Crain, Ltd.

(57) ABSTRACT

An assembly of an attachment pylon with an aircraft engine comprising a front engine mount comprising a front tang and a front clevis, a lower tang and a lower clevis connecting the attachment pylon and the engine via a front pin mounted in the front tang and clevis and a lower pin mounted in the lower tang and clevis, and port/starboard links mounted between the attachment pylon and the engine via mounting pins, wherein the front and lower pins are orthogonal to a mid-plane, and wherein the mounting pins of the links are parallel to the mid-plane.

12 Claims, 2 Drawing Sheets

ASSEMBLY OF AN ATTACHMENT PYLON WITH AN AIRCRAFT ENGINE

CROSS-REFERENCES TO RELATED APPLICATIONS

This application claims the benefit of French Patent Application Number 2307061 filed on Jul. 3, 2023, the entire disclosure of which is incorporated herein by way of reference.

FIELD OF THE INVENTION

The present invention relates to an assembly of an attachment pylon with an aircraft engine, comprising a mounting system in the form of a front engine mount, wherein the mounting system is compact, and an aircraft comprising at least one such assembly.

BACKGROUND OF THE INVENTION

An aircraft conventionally comprises at least one engine, particularly a turbojet engine. Under each wing and for each engine, the aircraft comprises an engine pylon that is fastened to the structure of the wing and extends below the wing, and the engine is suspended under the engine pylon.

The engine is housed in a nacelle and fastened to the engine pylon by means of an engine mounting system comprising a front engine suspension mount on a first interface plane, a rear engine suspension mount on a second interface plane, and a thrust absorption path, which can either be incorporated into one of the aforementioned two engine suspension interface planes, or incorporated separately into a third interface plane.

There are a number of types of front engine mount that are satisfactory with respect to their current use. However, the fans of new engines are increasingly large in order to improve the performance of the engines, which accordingly reduces the distance between the cowls of the nacelle and the ground.

This means that a new arrangement must be defined that makes it possible to reduce the height of the front engine mount in order to move the nacelle away from the ground, and consequently the nacelle must be moved closer to the wing.

SUMMARY OF THE INVENTION

One object of the present invention is to propose a front engine mounting system for an aircraft engine comprising an engine pylon and an engine casing, the incorporation of which ensures a reduction in the overall height.

To this end, an assembly of an attachment pylon with an aircraft engine is proposed, the attachment pylon comprising a primary structure comprising an upper spar, a lower spar, port and starboard lateral panels and a front transverse reinforcement, the assembly having a vertical mid-plane and comprising a front engine mount fastened to the attachment pylon and to a casing of the engine, and comprising:

in the vertical mid-plane and on one of the front transverse reinforcement of the attachment pylon and the casing of the engine, a front tang, centered on the vertical mid-plane and on the other of the front transverse reinforcement of the attachment pylon and the casing of the engine, a front clevis, and in the vertical mid-plane and on one of the lower spar of the attachment pylon and the casing of the engine, a lower tang, centered on the vertical mid-plane and on the other of the lower spar of the attachment pylon and the casing of the engine, a lower clevis, for each port and starboard lateral panel or on the front transverse reinforcement, a first port tang and a first starboard tang extending orthogonally to the vertical mid-plane, for the casing of the engine, a second port tang and a second starboard tang, at least a first port link and a first starboard link, a front pin connecting the front tang and the front clevis, a lower pin connecting the lower tang and the lower clevis, a first port pin and a first starboard pin connecting the first port tang and the first starboard tang with the first port link and the first starboard link, a second port pin and a second starboard pin connecting the second port tang and the second starboard tang with the first port link and the first starboard link.

According to one embodiment, the front tang is arranged on the front transverse reinforcement of the attachment pylon and the front clevis is arranged on the casing of the engine.

According to one embodiment, the front clevis is arranged on the front transverse reinforcement of the attachment pylon and the front tang is arranged on the casing of the engine.

According to one embodiment, the lower tang is arranged on the lower spar of the attachment pylon and the lower clevis is arranged on the casing of the engine.

According to one embodiment, the lower clevis is arranged on the lower spar of the attachment pylon and the lower tang is arranged on the casing of the engine.

According to one embodiment, the casing of the engine takes the form of a ring and each front and lower clevis of the casing of the engine is formed by walls of the casing positioned on either side of the vertical mid-plane and forming protrusions from the casing between which the front and lower tangs of the attachment pylon are positioned.

According to one embodiment, the front tang is made up of two front plates.

According to one embodiment, the lower tang is made up of two lower plates.

According to one embodiment, the front engine mount also comprises a second port link and a second starboard link, the first port pin and the first starboard pin also connecting the first port tang and the first starboard tang with the second port link and the second starboard link, the second port pin and the second starboard pin also connecting the second port tang and the second starboard tang with the second port link and the second starboard link, the first and second port links and the first and second starboard links being mounted in parallel around the first and second port tangs and the first and second starboard tangs.

According to one embodiment, the pins of one of the pairs among the pair comprising the first port pin and the second port pin and the pair comprising the first starboard pin and the second starboard pin, connect the attachment pylon to the casing of the engine without play, the pins of the other of the pairs connect the attachment pylon to the casing of the engine with play, the lower pin connects the attachment pylon to the casing of the engine without play and the front pin connects the attachment pylon to the casing of the engine with play.

According to one embodiment, the pins of one of the pairs among the pair comprising the first port pin and the second port pin and the pair comprising the first starboard pin and the second starboard pin, connect the attachment pylon to the casing of the engine without play, the pins of the other of the pairs connect the attachment pylon to the casing of the engine with play, the lower pin connects the attachment pylon to the casing of the engine with play and the front pin connects the attachment pylon to the casing of the engine without play.

An aircraft is also proposed, comprising an assembly of an attachment pylon with an aircraft engine according to the invention.

The invention thus relates to a front engine mounting system for an aircraft engine, the front engine mounting system having a vertical mid-plane and comprising:

- an engine pylon comprising, on a front part, a nose having in the vertical mid-plane and at the front of the nose a front tang having a first front bore extending in a transverse direction that is orthogonal to the vertical mid-plane, and in the vertical mid-plane and under the nose, a lower tang having a first lower bore extending in the transverse direction, and on either side of the vertical mid-plane, a first port tang extending orthogonally to the vertical mid-plane and having a first port bore coaxial with a first port pin parallel to a longitudinal direction and a first starboard tang extending orthogonally to the vertical mid-plane and having a first starboard bore coaxial with a first starboard pin parallel to the longitudinal direction,
- a casing of the engine comprising a front clevis having a second front bore extending in the transverse direction, a lower clevis having a second lower bore extending in the transverse direction, a second port tang having a second port bore extending in the longitudinal direction, and a second starboard tang having a second starboard bore extending in the longitudinal direction,
- at least a first port link having first and second bores,
- at least a first starboard link having third and fourth bores,
- a front pin extending in the transverse direction mounted in the first front bore and in the second front bore,
- a lower pin extending in the transverse direction mounted in the first lower bore and in the second lower bore,
- a first port pin mounted in the first port bore and the first bore of the first port link,
- a second port pin mounted in the second port bore and the second bore of the first port link,
- a first starboard pin mounted in the first starboard bore and the first bore of the first starboard link, and
- a second starboard pin mounted in the second starboard bore and the second bore of the first starboard link.

Such a mounting system has a vertically reduced footprint.

Advantageously, the casing takes the form of a ring and each front and lower clevis of the casing is formed by walls of the casing positioned on either side of the vertical mid-plane and forming protrusions from the casing between which the front and lower tangs are positioned.

Advantageously, the front tang is made up of two front plates, wherein each front plate has a front sub-bore, wherein the two front sub-bores continue on from each other and form the first front bore.

Advantageously, the lower tang is made up of two lower plates, wherein each lower plate has a lower sub-bore, wherein the two lower sub-bores continue on from each other and form the first lower bore.

Advantageously, said front engine mounting system also comprises a second port link having first and second bores, wherein the first port pin is also mounted in the first bore of the second port link, wherein the second port pin is also mounted in the second bore of the second port link, the first and second port links being mounted in parallel around the first and second port tangs, and said front engine mounting system also comprises a second starboard link having third and fourth bores, wherein the first starboard pin is also mounted in the third bore of the second starboard link, wherein the second starboard pin is also mounted in the fourth bore of the second starboard link, the first and second starboard links being mounted in parallel around the first and second starboard tangs.

According to one particular embodiment, the pins of one of the pairs among the pair comprising the first port pin and the second port pin and the pair comprising the first starboard pin and the second starboard pin, are mounted without play in the associated bores, the pins of the other of the pairs are mounted with radial play in the associated bores, the lower pin is mounted without play in the associated bores and the front pin is mounted with radial play in the associated bores.

According to one particular embodiment, the pins of one of the pairs among the pair comprising the first port pin and the second port pin and the pair comprising the first starboard pin and the second starboard pin, are mounted without play in the associated bores, the pins of the other of the pairs are mounted with radial play in the associated bores, the lower pin is mounted with radial play in the associated bores and the front pin is mounted without play in the associated bores.

The invention also proposes an aircraft comprising a structure, an engine and a front engine mounting system according to one of the preceding variants, wherein the engine pylon is fastened to the structure and wherein the casing is a casing of the engine.

BRIEF DESCRIPTION OF THE DRAWINGS

The aforementioned features of the invention, and others, will become more clearly apparent on reading the following description of one exemplary embodiment, said description being given with reference to the appended drawings, in which.

DETAILED DESCRIPTION OF THE PREFERRED EMBODIMENTS

Figure 1:
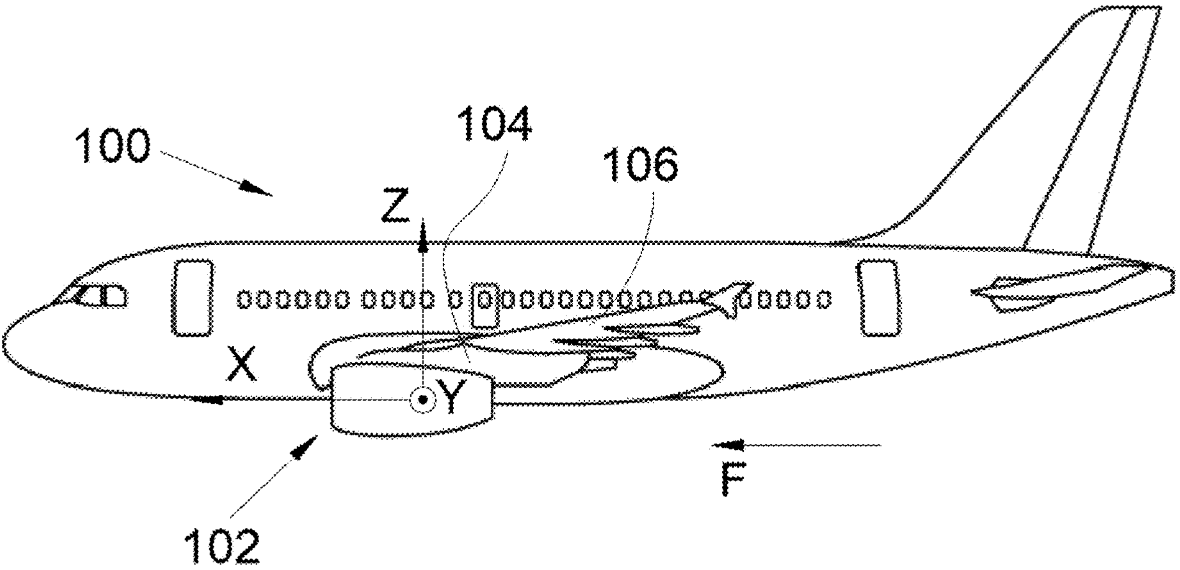
FIG. 1 is a side view of an aircraft according to the invention.

In the following description, terms relating to position are given with reference to an aircraft in a position of forward travel, that is, as the aircraft is shown in FIG. 1, in which the arrow F shows the direction of forward travel.

FIG. 1 shows an aircraft 100 that has an engine 102, in particular a turbojet engine that is fastened under an attachment pylon, also referred to as an engine pylon 104, in turn fastened under a wing 106.

In the following description, as is conventional, the longitudinal direction of the engine 102, which is oriented positively in the direction of travel of the aircraft 100, is referred to as X, the transverse direction of the engine 102, which is horizontal when the aircraft 100 is on the ground, is referred to as Y, and the vertical direction or vertical height when the aircraft 100 is on the ground, is referred to as Z, these three directions X, Y and Z being orthogonal to each other.

The engine 102 generally has a shape exhibiting symmetry of revolution about the longitudinal axis X.

In the embodiment of the invention shown in FIG. 1, the aircraft 100 comprises one engine 102 under each wing 106 of the aircraft 100, but it is possible to provide a plurality of engines under each wing 106.

Figure 2:
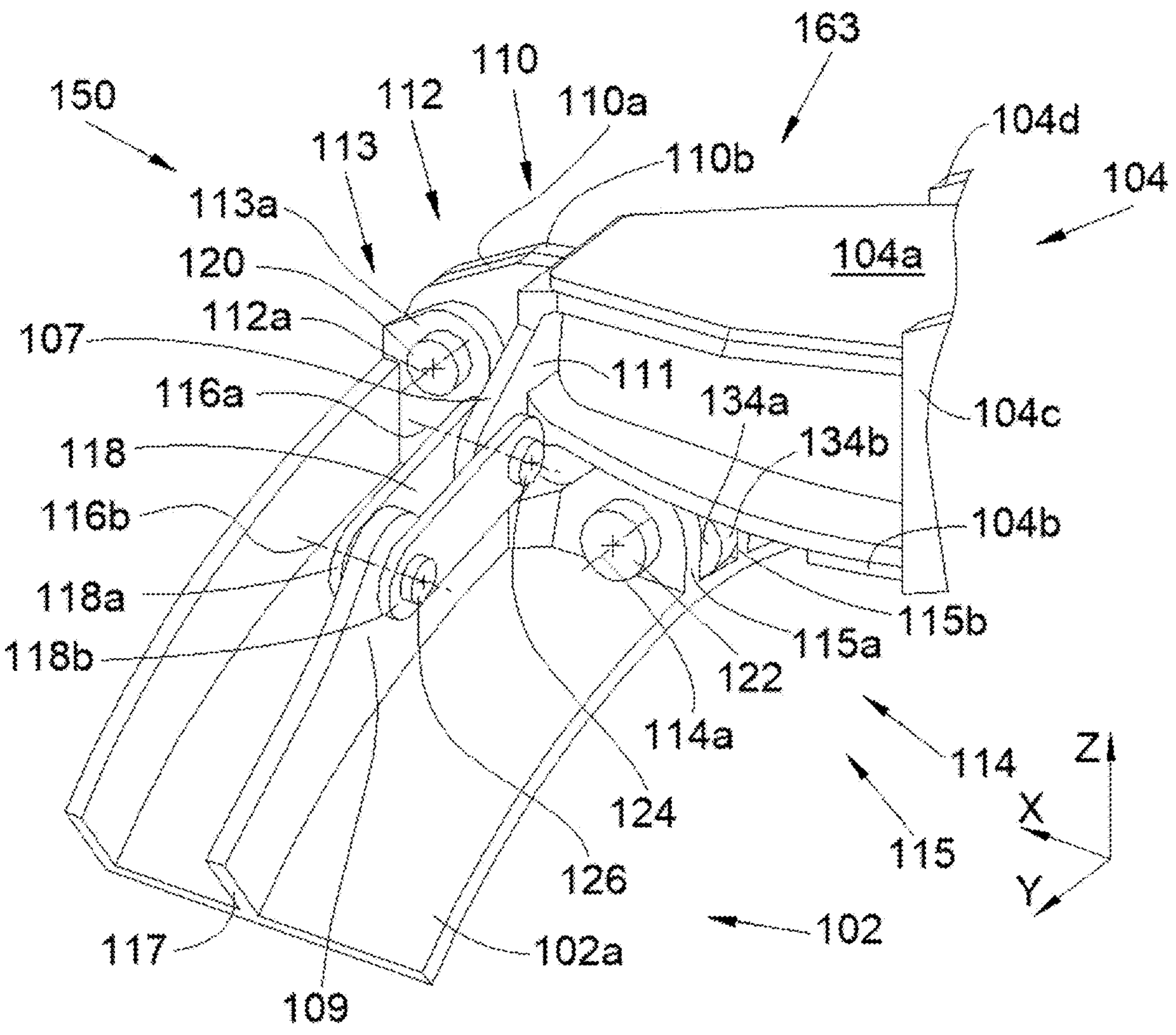
FIG. 2 is a perspective view of an assembly of an attachment pylon with an aircraft engine according to the invention.

FIG. 2 shows the port part of an assembly of the attachment pylon 104 with the aircraft engine 102, which comprises a front engine mounting system 150, also referred to as the front engine mount, for the engine 102 according to the invention, the starboard part being generally symmetrical with the port part relative to a vertical mid-plane XZ of the assembly.

The assembly comprises the fastening of a casing 102*a* of the engine 102 to the engine pylon 104 and of the engine pylon 104 to the structure of the wing 106, and more generally to a structure of the aircraft 100.

The casing 102*a* is a casing of the engine 102 and takes the general form here of a cylinder about the longitudinal direction X. The engine 102 is not described in greater detail as said engine can take any form known to a person skilled in the art.

The assembly is fastened to the structure of the aircraft 100, here the structure of the wing 106, and extends under the wing 106 and supports the engine 102 by means of the casing 102*a* of the engine 102.

Conventionally, a rear engine mount is fastened between the engine pylon 104 and a rear part of the engine 102, and it can take any form known to a person skilled in the art.

The engine pylon 104 takes the form of a box that here comprises an upper wall 104*a*, also referred to as the upper spar, a lower wall 104*b*, also referred to as the lower spar, and two lateral walls 104*c-d*, also referred to as the port and starboard lateral panels. The various walls 104*a-d* are rigidly connected to each other so that they form a box, the vertical cross-section of which is generally trapezoid.

The engine pylon 104 comprises, on a front part 163 of the box, a front transverse reinforcement, also referred to as the nose 110, fastened on the front part 163 by any known means, such as welding or bolting. The front part 163 corresponds to the front ends of the walls 104*a-d*.

In the following description, only the elements on the port side are visible in FIG. 2, but the elements on the starboard side are symmetrical relative to the vertical mid-plane XZ.

The nose 110 has, in the vertical mid-plane XZ and at the front of the nose 110, a front tang 112 through which passes a first front bore coaxial with a front pin 112*a*. In other words, the front transverse reinforcement 110 comprises the front tang 112 in the vertical mid-plane XZ. According to another embodiment, the front transverse reinforcement 110 comprises a front clevis centered on the vertical mid-plane XZ.

The lower wall 110 (or under the nose 110) has, in the vertical mid-plane XZ, a lower tang 114 through which passes a first lower bore coaxial with a lower pin 114*a*. Here, the lower pin 114*a* is parallel with the front pin 112*a*. The lower pin 114*a* and front pin 112*a* both extend in the transverse direction Y perpendicular to the vertical mid-plane XZ, and therefore extend here generally parallel to the transverse direction Y. In other words, the lower wall 104*b* comprises the lower tang 114 in the vertical mid-plane XZ. According to another embodiment, the lower spar 104*b* comprises a lower clevis centered on the vertical mid-plane XZ. According to another embodiment, the transverse reinforcement 110 comprises the lower tang 114 in the vertical mid-plane XZ, under said front transverse reinforcement 110. According to another embodiment, the transverse reinforcement 110 comprises a lower clevis centered on the vertical mid-plane XZ, arranged under the transverse reinforcement 110.

On either side of the vertical mid-plane XZ, the nose 110 has a lateral stiffener 111 that extends perpendicularly to the vertical mid-plane XZ. There is thus a port lateral stiffener 111 that comprises a first port tang 107 extending orthogonally to the vertical mid-plane XZ and through which passes a first port bore coaxial with a first port pin 116*a*, and a starboard lateral stiffener that comprises a first starboard tang extending orthogonally to the vertical mid-plane XZ and through which passes a first starboard bore coaxial with a first starboard pin. In other words, the front transverse reinforcement 110 comprises a first port tang 107 and a first starboard tang extending orthogonally to vertical mid-plane XZ. According to one embodiment, the port and starboard lateral walls or lateral panels 104*c-d* each comprise a first port tang 107 and a first starboard tang extending orthogonally to the vertical mid-plane XZ.

Here, the casing 102*a* takes the form of a ring and comprises a front clevis 113 through which passes a second front bore coaxial with the front pin 112*a*. According to one embodiment, the casing 102*a* of the engine 102 comprises a front tang.

The casing 102*a* also has a lower clevis 115 through which passes a second lower bore coaxial with the lower pin 114*a*. According to one embodiment, the casing 102*a* of the engine 102 comprises a lower tang.

Each clevis 113, 115 of the casing 102*a* of the engine 102 is formed by two walls 113*a* (only one is visible in FIG. 2) and 115*a-b*, which are on either side of the vertical mid-plane XZ. The front tang 112 and the lower tang 114 of the attachment pylon 104 are arranged between the two walls 113*a*, 115*a-b* of the casing 102*a* of the engine 102 in order to form a clevis connection.

The two walls 113*a*, 115*a-b* forming each clevis 113, 115 are thus generally parallel to the vertical mid-plane XZ and a bore passes through each one, said bore forming with the bore of the other wall the second front bore or the second lower bore.

On either side of the vertical mid-plane XZ, the casing 102*a* has a lateral flange 117 that extends perpendicularly to the vertical mid-plane XZ. There is thus a port lateral flange 117 that comprises a second port tang 109 through which passes a second port bore coaxial with a second port pin 116*b* and a starboard lateral flange that comprises a second starboard tang through which passes a second starboard bore coaxial with a second starboard pin. The second port/starboard bore is on the outside relative to the first port/starboard bore of the port lateral stiffener 111.

The first port pin 116*a* is parallel to the second port pin 116*b* and separate from said second port pin 116*b*. Likewise, the first starboard pin is parallel to the second starboard pin and separate from said second starboard pin.

The front engine mount 150 also comprises a pair of port links 118 comprising a first port link 118*a* having first and second bores, and a second port link 118*b* having first and second bores, together with a pair of starboard links comprising first and second starboard links each having third and fourth bores. The pairs of links 118 are positioned on either side of the vertical mid-plane XZ and here, each link 118 is contained in a lateral plane YZ.

For safety reasons, the first and second port links 118*a-b* are mounted parallel to each other, around the first and second port tangs 107, 109, between the associated first pin 124 and second pin 126. Each first and second port link 118*a-b* is thus pierced by a bore making it possible to receive the corresponding pin 124, 126. In the event of the failure of one of the first and second port links 118*a-b*, the pair of starboard links thus takes over.

Each pair of links 118 forms a clevis in which are positioned the lateral stiffener 111 of the nose 110 and the lateral flange 117 of the casing 102*a*.

The front engine mount 150 also comprises a front pin 120 (also referred to as the front shaft) extending in the transverse direction Y and mounted in the first front bore and in the second front bore, in order to produce a clevis assembly between the front tang 112 and the front clevis 113, that is, a pivot connection around the front pin 112*a*. In other words, the front pin 120 connects the front tang 112 and the front clevis 113.

The front engine mount 150 also comprises a lower pin 122 (also referred to as the lower shaft) extending in the transverse direction Y and mounted in the first lower bore and the second lower bore, in order to produce a clevis assembly between the lower tang 114 and the lower clevis 115, that is, a pivot connection around the lower pin 114*a*. In other words, the lower pin 122 connects the lower tang 114 and the lower clevis 115.

The front engine mount 150 also comprises a first port pin 124 (also referred to as the first port shaft) mounted in the first port bore, in the first bore of the first port link 118*a* and in the first bore of the second port link 118*b*, in order to produce a pivot connection between the first port bore and the pair of port links 118 around the first port pin 116*a*. In other words, the first port pin 124 connects the first port tang 107 and the first port link 118*a*.

The front engine mount 150 also comprises a second port pin 126 (also referred to as the second port shaft) mounted in the second port bore, in the second bore of the first port link 118*a* and in the second bore of the second port link 118*b*, in order to produce a pivot connection between the second port bore and the pair of port links 118 around the second port pin 116*b*. In other words, the second port pin 126 connects the second port tang 109 and the first port link 118*a*.

Symmetrical mounting is envisaged for the starboard link, with a first starboard pin (also referred to as the first starboard shaft) mounted in the first starboard bore and the first bore of the first and second links of the pair of starboard links in order to form a pivot connection about the first starboard pin, and a second starboard pin (also referred to as the second starboard shaft) mounted in the second starboard bore and the second bore of the first and second links of the pair of starboard links in order to produce a pivot connection around the second starboard pin. In other words, the first starboard pin connects the first starboard tang and the first starboard link and the second starboard pin connects the second starboard tang and the first starboard link.

In this assembly, the front pin 112*a* and the lower pin 114*a* extend in the transverse direction Y and are perpendicular to the mid-plane XZ, and the first port pin 116*a*, the first starboard pin, the second port pin 116*b* and the second starboard pin are parallel to the mid-plane XZ, and here generally parallel to the longitudinal direction X.

Such an assembly makes it possible to reduce the height of the casing 102*a* and also makes it possible to reduce the height of the upper aerodynamic line of the secondary stream of the engine 102, referred to as the crest line, that is, the stream around the nose 110.

The various pins are prevented from translation by any appropriate means known to a person skilled in the art, such as nuts, and each shaft is coaxial with the axis in question.

With such a front engine mount 150 and an appropriate rear engine mount, the overall engine mounting system is referred to as "isostatic", that is, translation in the three directions X, Y and Z and the three rotations about these axes (Mx, My, Mz) are prevented.

The front engine mount 150 makes it possible to control the shear loads in the three directions X, Y and Z and, by combination with an appropriate rear engine mount, the moments My and Mz.

The loads in the directions X and Z are governed by means of the front pin 120 and the lower pin 122 and the loads in the direction Y are governed by means of the links 118.

In the embodiment of the invention shown in FIG. 2, the casing 102*a* takes the form of a continuous ring over 360° and comprises the central clevis 113, which comprises the walls 113*a*, forming protrusions from the casing 102*a*, and the lower clevis 115, which comprises the walls 115*a-b*, forming protrusions from the casing 102*a*. Each clevis 113, 115 of the casing 102*a* is thus formed by the walls 113*a*, 115*a-b* of the casing 102*a*. The walls 113*a*, 115*a-b* are incorporated into the casing 102*a*, and form protrusions from the casing 102*a*. The walls 113*a*, 115*a-b* can be produced by any method, for example these walls can be molded, cast, welded or machined from a single piece. The front tang 112 and lower tang 114 are thus respectively accommodated between the walls 113*a* of the central clevis 113 and between the walls 115*a-b* of the lower clevis 115. The walls 113*a*, 115*a-b* thus form lugs, situated on either side of the vertical mid-plane XZ, and between which the front tang 112 and lower tang 114 are arranged.

Likewise, for safety reasons, the front tang is formed by two front plates 110*a-b*, which here are symmetrical relative to the vertical mid-plane XZ. The two front plates 110*a-b* are positioned on either side of the vertical mid-plane XZ and are fastened to each other and to the engine pylon 104 by any appropriate fastening means such as threaded elements, spot welds, etc. The two front plates 110*a-b* can be machined from a single piece.

Each front plate 110*a-b* has a front sub-bore, and the two front sub-bores continue on from each other and form the first front bore.

Likewise, for safety reasons, the lower tang 114 is formed by two lower plates 134*a-b*, which here are symmetrical relative to the vertical mid-plane XZ. The two lower plates 134*a-b* are positioned on either side of the vertical mid-plane XZ and are fastened to each other and to the engine pylon 104 by any appropriate fastening means such as threaded elements, spot welds, etc. The two lower plates 134*a-b* can be machined from a single piece.

Each lower plate 134*a-b* has a lower sub-bore, and the two lower sub-bores continue on from each other and form the first lower bore.

When the engine 102 is operating, loads are generated and are transferred to the structure of the wing through the front engine mount 150, that is, inter alia, the casing 102*a* and the engine pylon 104, through a primary load path.

Some elements of the front engine mount 150 thus produce the primary load path while other elements provide secondary load paths that compensate for a failure of the primary load path, these other elements forming waiting fail-safe means.

According to a first embodiment of the invention, the pins of one of the pairs among the pair comprising the first port pin 124 and the second port pin 126 and the pair comprising the first starboard pin and the second starboard pin, are mounted without play in the associated bores. In other words, the pins of one of the pairs among the pair comprising the first and second port pins 124, 126 and the pair comprising the first and second starboard pins, connect the attachment pylon 104 to the casing 102*a* of the engine 102 without play. That is, either the port pins 124 and 126 and the associated pair of links 118 provide the primary load path, or the starboard pins and the pair of associated links provide the primary load path.

According to this first embodiment, the pins of the other pair are mounted with radial play in the associated bores, that is, the pins of the other pair provide the secondary load path. In other words, the pins of the other pair connecting the attachment pylon 104 to the casing 102*a* of the engine 102 are mounted with play.

Still according to this first embodiment, the lower pin 122 is mounted without play in the associated bores to provide the primary load path and the front pin 120 is mounted with radial play in the associated bores to provide the secondary load path. In other words, the lower pin 122 connects the attachment pylon 104 to the casing 102*a* of the engine 102 without play and the front pin 120 connects the attachment pylon 104 to the casing 102*a* of the engine 102 with play.

According to a second embodiment of the invention, and as for the first embodiment, the pins of one of the pairs among the pair comprising the first port pin 124 and the second port pin 126 and the pair comprising the first starboard pin and the second starboard pin, are mounted without play in the associated bores. That is, either the port pins 124 and 126 and the associated pair of links 118 provide the primary load path, or the starboard pins and the pair of associated links provide the primary load path.

According to this second embodiment, the pins of the other pair are mounted with radial play in the associated bores in order to provide the secondary load path.

In this second embodiment, the lower pin 122 is mounted with radial play in the associated bores to provide the secondary load path and the front pin 120 is mounted without play in the associated bores to provide the primary load path. In other words, the lower pin 122 connects the attachment pylon 104 to the casing 102*a* of the engine 102 with play and the front pin 120 connects the attachment pylon 104 to the casing 102*a* of the engine 102 without play.

The mountings without play allow the loads to be transferred directly from one part to the other, while the presence of play does not allow the loads to be transferred directly. This load transfer only becomes possible if an element of the primary load path is defective and two elements that are mounted with play relative to each other move to cancel out the play and come into contact, and thus provide the load transfer.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly of an attachment pylon with an aircraft engine, the attachment pylon comprising a primary structure comprising an upper spar, a lower spar, port and starboard lateral panels and a front transverse reinforcement, the assembly having a vertical mid-plane and comprising:

a front engine mount fastened to the attachment pylon and to a casing of the engine, and comprising:

in the vertical mid-plane and on one of the front transverse reinforcement of the attachment pylon and the casing of the engine, a front tang, centered on the vertical mid-plane and on the other of the front transverse reinforcement of the attachment pylon and the casing of the engine, a front clevis, in the vertical mid-plane and on one of the lower spar of the attachment pylon and the casing of the engine, a lower tang, centered on the vertical mid-plane and on the other of the lower spar of the attachment pylon and the casing of the engine, a lower clevis, for each port and starboard lateral panel or on the front transverse reinforcement, a first port tang and a first starboard tang extending orthogonally to the vertical mid-plane, for the casing of the engine, a second port tang and a second starboard tang, at least a first port link and a first starboard link, a front pin connecting the front tang and the front clevis, a lower pin connecting the lower tang and the lower clevis, a first port pin and a first starboard pin connecting the first port tang and the first starboard tang with the first port link and the first starboard link, and, a second port pin and a second starboard pin connecting the second port tang and the second starboard tang with the first port link and the first starboard link.

2. The assembly according to claim 1, wherein the front tang is arranged on the front transverse reinforcement of the attachment pylon and the front clevis is arranged on the casing of the engine.

3. The assembly according to claim 1, wherein the front clevis is arranged on the front transverse reinforcement of the attachment pylon and the front tang is arranged on the casing of the engine.

4. The assembly according to claim 1, wherein the lower tang is arranged on the lower spar of the attachment pylon and the lower clevis is arranged on the casing of the engine.

5. The assembly according to claim 1, wherein the lower clevis is arranged on the lower spar of the attachment pylon and the lower tang is arranged on the casing of the engine.

6. The assembly according to claim 2, wherein the casing of the engine comprises a ring and wherein each front and lower clevis of the casing of the engine is formed by walls of the casing positioned on either side of the vertical mid-plane and forming protrusions from the casing between which are positioned the front tang and lower tang of the attachment pylon.

7. The assembly according to claim 1, wherein the front tang is formed by two front plates.

8. The assembly according to claim 1, wherein the lower tang is formed by two lower plates.

9. The assembly according to claim 1, wherein the front engine mount also comprises a second port link and a second starboard link, the first port pin and the first starboard pin also connecting the first port tang and the first starboard tang with the second port link and the second starboard link, the second port pin and the second starboard pin also connecting the second port tang and the second starboard tang with the second port link and the second starboard link, the first and second port links and the first and second starboard links being mounted in parallel around the first and second port tangs and the first and second starboard tangs.

10. The assembly according to claim 1, wherein pins of one of a pair among the first port pin and the second port pin and a pair comprising the first starboard pin and the second starboard pin, connect the attachment pylon to the casing of the engine without play, wherein the pins of the other of the pairs connect the attachment pylon to the casing of the engine with play, wherein the lower pin connects the attachment pylon to the casing of the engine without play, and wherein front pin connects the attachment pylon to the casing of the engine with play.

11. The assembly according to claim 1, wherein pins of one of a pair comprising the first port pin and the second port pin and the pair comprising the first starboard pin and the second starboard pin, connect the attachment pylon to the casing of the engine without play, wherein that the pins of the other of the pairs connect the attachment pylon to the casing of the engine with play, wherein that the lower pin connects the attachment pylon to the casing of the engine with play, and wherein the front pin connects the attachment pylon to the casing of the engine without play.

12. An aircraft comprising:

the assembly according to claim 1.

* * * * *